US008908346B2

(12) United States Patent
Birkholz et al.

(10) Patent No.: US 8,908,346 B2
(45) Date of Patent: Dec. 9, 2014

(54) OVERVOLTAGE PROTECTION DEVICE

(75) Inventors: Christian Birkholz, Lippetal (DE); Steffen Pfoertner, Springe (DE); Friedrich-Eckhard Brand, Barntrup (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 165 days.

(21) Appl. No.: 13/636,751

(22) PCT Filed: Mar. 24, 2011

(86) PCT No.: PCT/EP2011/001471
§ 371 (c)(1),
(2), (4) Date: Sep. 24, 2012

(87) PCT Pub. No.: WO2011/116960
PCT Pub. Date: Sep. 29, 2011

(65) Prior Publication Data

US 2013/0010395 A1 Jan. 10, 2013

(30) Foreign Application Priority Data

Mar. 24, 2010 (DE) ......................... 10 2010 012 684

(51) Int. Cl.
*H02H 9/00* (2006.01)
*H01T 4/06* (2006.01)

(52) U.S. Cl.
CPC ........................................ *H01T 4/06* (2013.01)
USPC .......................................................... 361/118

(58) Field of Classification Search
USPC .......................................................... 361/118
See application file for complete search history.

(56) References Cited

U.S. PATENT DOCUMENTS

| | | | | |
|---|---|---|---|---|
| 4,117,264 | A * | 9/1978 | Charles et al. | 257/702 |
| 5,548,641 | A * | 8/1996 | Butler et al. | 379/413.04 |
| 7,116,779 | B1 * | 10/2006 | Meyerhoefer et al. | 379/412 |
| 7,411,769 | B2 | 8/2008 | Schimanski et al. | |
| 7,778,003 | B2 * | 8/2010 | Metral et al. | 361/119 |

FOREIGN PATENT DOCUMENTS

| | | | |
|---|---|---|---|
| DE | 33 46 753 | C2 | 2/1987 |
| DE | 103 04 492 | A1 | 8/2004 |
| DE | 10 2008 031 200 | A1 | 1/2010 |
| WO | 2008/003532 | A1 | 1/2008 |
| WO | 2008/009507 | A1 | 1/2008 |

* cited by examiner

*Primary Examiner* — Stephen W Jackson
(74) *Attorney, Agent, or Firm* — Roberts Mlotkowski Safran & Cole, P.C.; David S. Safran

(57) ABSTRACT

An overvoltage protection device for protecting electrical low-voltage installations, having a lower device part and at least one upper device part, wherein the lower device part has input and output terminals for the electrical conductors to be connected and contact elements connected to the input and output terminals. The upper device part has at least one overvoltage protection element. An intermediate device part is additionally provided which can be fitted onto the lower device part and onto which the upper device part can be fitted. The intermediate device part has mating contact elements corresponding to the contact elements of the lower device part and also has contact elements connected to the mating contact elements. The intermediate part has at least one longitudinal element connected between two mating contact elements, and the upper device part has mating contact elements corresponding to the contact elements of the intermediate device part.

20 Claims, 4 Drawing Sheets

OVERVOLTAGE PROTECTION DEVICE

BACKGROUND OF THE INVENTION

1. Field of the Invention

The invention relates to an overvoltage protection device for protecting electrical low voltage installations, with a lower device part and at least one upper device part, the lower device part having input and output terminals for electrical conductors and contact elements which are connected to the input and output terminals and which are made especially as plug sockets, and the upper device part having at least one protection element.

2. Description of Related Art

Electrical circuits normally work free of noise with the voltage which is specified for it, i.e., the rated voltage. This does not apply when overvoltages occur. Overvoltages are all voltages which are above the upper tolerance limit of the rated voltage. They also include mainly transient overvoltages which can occur due to atmospheric discharges, as well as due to switching operations or short circuits in power supply networks and can be coupled conductively, inductively or capacitively into electrical circuits. In order to protect electrical or electronic circuits, especially electronic measurement, control and switching circuits against transient overvoltages, overvoltage protection elements which capture and limit overvoltage peaks have been developed and have been known for many years.

The required measures for protection of the power supply of installations and devices are classified into various stages depending on the choice of arresters and the ambient influences which can be expected. The overvoltage protection devices for the individual stages differ by the level of the discharge capacity and the protection level.

The first protection stage (type 1) is generally formed by a lightning stroke current arrester which is installed as an extremely powerful protection device in the central power supply of a building. An important component of such a lightning stroke current arrester is a spark gap with at least two electrodes, when the spark gap is struck an arc forming between the two electrodes.

The second protection stage (type 2) generally forms a varistor-based surge arrester. The protection stage again limits the remaining residual voltage via the lightning stroke current arrester. Depending on the risk potential of the installation which is to be protected or of the building which is to be protected, in the individual case it can be sufficient if the second protection stage is started.

The third protection stage (type 3) is called apparatus protection and is generally installed directly upstream of the device which is to be protected. With the apparatus protection a residual voltage which is safe for the connected device is achieved. These overvoltage protection devices exist in different designs, especially also as switchgear cabinet module.

In MSR technology, as a result of the high sensitivity to overvoltages the overvoltage protection devices often have overvoltage protection elements with combined protective circuits, one overvoltage limiting component being used for coarse protection and one overvoltage limiting component being used for fine protection. The components which can be especially gas-filled surge arresters, spark gaps, varistors or suppressor diodes are often connected indirectly in parallel, between the overvoltage protection elements there being longitudinal elements as decoupling resistors which must be adapted to the respective protective circuit, i.e., to the overvoltage protection elements used.

This invention is used especially in overvoltage protection devices which are used for apparatus protection and which are made as a switchgear cabinet module. However, the invention is not limited thereto and can be implemented fundamentally also in overvoltage protection devices of type 1 or of type 2.

For reasons of modularity and flexibility and to facilitate repair efforts, switchgear cabinet modules are often made in at least two parts, one of which is a permanently installed base element as a lower device part and the other is comprised of at least one interchangeable protective plug as an upper device part. The base element is used to fasten an overvoltage protection device on a mounting rail and to connect the individual electrical conductors, for which the base element has corresponding input and output terminals, which can be made in any connection technology, for example, screw terminals, tension spring terminals, direct clamp-type terminals, or quick connect terminals. Depending on the version, this overvoltage protection device can be made as two-wire, three-wire or four-wire protection. The protective plug has the actual overvoltage protection circuit with the overvoltage protection element or elements which are matched to the respective application. Fundamentally two or more protective plugs can also be plugged onto a corresponding wide base element next to one another in the longitudinal direction of the mounting rail.

To easily make mechanical and electrical contact of the lower device part with the respective upper device part, the lower device part has plug sockets connected to the terminals and the upper device part has corresponding plug pins so that the upper device part can be plugged onto the lower device part without tools. In addition, the known overvoltage protection device has another changeover contact as transducer for remote reporting of the state of at least one protection element, as a result of which comfortable remote monitoring is possible. Moreover, for example, German Utility Model DE 20 2004 006 227 U1 and corresponding U.S. Pat. No. 7,411,769 B2 disclose that the upper device part has an optical state display which can be mechanically actuated. In this way, the state of the overvoltage protection device can also be easily read off directly on the device.

An overvoltage protection device underlying the invention has already been fundamentally described in German Patent DE 33 46 753 C2. This type of overvoltage protection device has been marketed for many years by the assignee of the present application under the product name "PLUGTRAB PT" (see, Phoenix Contact brochure "Overvoltage Protection TRABTECH 2007, pages 60 and 61). One important feature of this overvoltage protection device is the possibility of being able to insert and withdraw individual protective plugs in an impedance-neutral manner, as a result of which sensitive signal circuits, such as for example, terminal measurements or bus systems, are not influenced when the protective plug is replaced. For this purpose, in the lower device part, there are longitudinal elements, especially decoupling resistors, in the line paths which run continuously between input and output terminals which are assigned to one another. Since the base element also remains installed in the through wiring when the protective plug is replaced, interrupt-free and impedance-neutral withdrawal and insertion of the protective plug for test and replacement purposes are thus possible.

Even if the aforementioned overvoltage protection devices have greatly proven themselves in practice, they have the disadvantage that, not only are a plurality of protective plugs matched to the respective application, but also a large number of different base elements must be made available which have longitudinal elements which are matched to the protection circuit which is located in the protective plug. The number of base parts which are to be made available by the manufacturer of the overvoltage protection devices in the prior art is reduced in that the longitudinal elements are also integrated in the plug-in upper device part; but this results in that the impedance of the electric circuit or signal circuit is changed when the protective plug is inserted and withdrawn.

SUMMARY OF THE INVENTION

Therefore, the object of this invention is to provide an overvoltage protection device of the initially described type in which a number of device types which is as large as possible with a number of different components which is as small as possible can be achieved, and impedance-neutral insertion and withdrawal of the protective plug will be ensured.

This object is achieved in an overvoltage protection device of the initially described type in that, in addition, there is an intermediate device part which can be plugged onto the lower device part on the one hand, and on the other hand, onto which the upper device part can be plugged, the intermediate device part having mating contact elements which correspond to the contact elements of the lower device part and which are made especially as plug pins, and contact elements which are connected to the mating contact elements and which are made especially as plug sockets. In the intermediate device part, there is also at least one longitudinal component which is connected between two mating contact elements and which can be especially a resistor and/or an inductance. So that the upper device part can be plugged onto the intermediate device part, the upper device part has mating contact elements which correspond to the contact elements of the intermediate device part and which are made preferably likewise as plug pins.

The overvoltage protection device in accordance with the invention is thus made not only with two parts, but three parts, specifically in addition to the lower device part and the upper device part, it also has another intermediate device part, the intermediate device part having longitudinal elements so that the upper device part, which has the overvoltage protection elements, can be inserted and withdrawn without interruption and in an impedance-neutral manner. In contrast to the known “PLUGTRAP PT” overvoltage protection device referred to above, in accordance with the invention, not only is the overvoltage protection device made in two parts, but moreover, the lower device part is again divided, specifically into a permanently installable base element which is used for connection of the individual electrical conductors and preferably also for attaching the overvoltage protection device to a mounting rail, and an intermediate device part which can be plugged onto the base part and in which the longitudinal components are located.

The overvoltage protection device in accordance with the invention is preferably used in measurement and control engineering for protection of the devices and the signal circuits and electrical circuits used there. Especially for these applications does the overvoltage protection device in accordance with the invention advantageously have a combined protection circuit which is comprised of at least two overvoltage protection elements, at least one overvoltage protection element being used as fine protection element and at least one overvoltage protection element being used as coarse protection element. The fine protection element is formed, for example, by a suppressor diode or a varistor and the coarse protection element is formed by a gas-filled surge arrester or a spark gap.

The overvoltage protection device in accordance with the invention has the advantage that a lower device part—assuming dimensions corresponding to one another—can be used together with different upper device parts. Because the longitudinal elements which are located in terms of circuitry between the different overvoltage protection elements in the upper device part are located in the intermediate device part, both matching of the longitudinal components to the overvoltage protection elements used at the time and also impedance-neutral insertion and withdrawal of an upper device part are possible.

In the installation of the lower device part, first of all, it need not be considered which overvoltage protection is to be used, i.e., how the protection circuit in the upper device part is made. The installation of the lower device part can thus take place open as to the particular application since the lower device part does not have any longitudinal elements matched to the protective circuit in the upper device part. Only by plugging on the intermediate device part with the longitudinal elements which are located in it does a configuration of the lower device part with respect to the longitudinal elements arise.

According to one configuration of the invention, the input and output terminals which correspond to one another in the lower device part are each connected to one another in an electrically conductive manner via a separable element which is separated when the intermediate device part is plugged onto the lower device part. If the intermediate device part has not yet been plugged onto the lower device part, the input and output terminals which correspond to one another are thus connected to one another in an electrically conductive manner, i.e., the lower device part has a longitudinal impedance with a resistance that is very low, or is roughly 0 ohm. Conversely, if the intermediate device part has been plugged onto the lower device part, this direct connection is separated and the input and output terminals are then connected to one another via the longitudinal elements which are located in the intermediate device part.

The separable elements can be implemented by break contacts or isolating contacts which are located between the input and output terminals which correspond to one another in the lower device part. The break contacts and the isolating contacts are located in the lower device part such that they are actuated when the intermediate device part is plugged on, i.e., a break contact or an isolating contact is opened or separated by an actuating section which is made on the intermediate device part.

In order to ensure that only one such upper device part can be plugged onto an intermediate device part whose protection elements are matched to the corresponding longitudinal elements, coding is advantageously formed between the upper device part and the intermediate device part. For this purpose, for example, the upper device part on its bottom has a recess and the intermediate device part on its top has a corresponding coding pin. If the intermediate device parts with different longitudinal elements have coding pins at different positions or with different dimensions, in this way, it can be easily ensured that only one upper device part which is suitable for it with a corresponding recess can be plugged onto the intermediate device part.

According to another advantageous configuration of the overvoltage protection device in accordance with the invention, between the lower device part and the intermediate device part there is latching which is preferably made such that the intermediate device part, after plugging onto the lower device part, is latched captively in the lower device part. This ensures that, when the upper device part is withdrawn, the intermediate device part is likewise not unintentionally withdrawn from the lower device part. Since thus, when an upper device part is replaced, the intermediate device part also remains reliably installed together with the lower device part in the through wiring, interruption-free and impedance-neutral withdrawal and insertion of the protective plug are ensured for test and replacement purposes.

According to another preferred configuration, in the overvoltage protection device in accordance with the invention, the upper device part can have a display which signals the operating state of the protective element so that it can be read off directly on site. Moreover, the overvoltage protection device can also have an additional telecommunications contact so that, alternatively or additionally, remote monitoring is possible. In addition, the lower device part and/or the upper device part can have a display which signals the correct installation state of the upper device part on the intermediate device part or the intermediate device part in the lower device part.

If the lower device part has a ground terminal for connection of a ground wire, the ground terminal can be linked either directly via a metallic mounting foot which is located in the lower device part or indirectly, for example, via a gas arrester, to the mounting foot, the mounting foot preferably establishing the electrical connection to the mounting rail which carries the ground potential preferably directly when the lower device part is placed on a mounting rail.

In particular, there are now numerous possibilities for embodying and developing the overvoltage protection device in accordance with the invention as will be apparent from the following description of preferred exemplary embodiments in conjunction with the accompanying drawings.

DETAILED DESCRIPTION OF THE INVENTION

Figure 1:
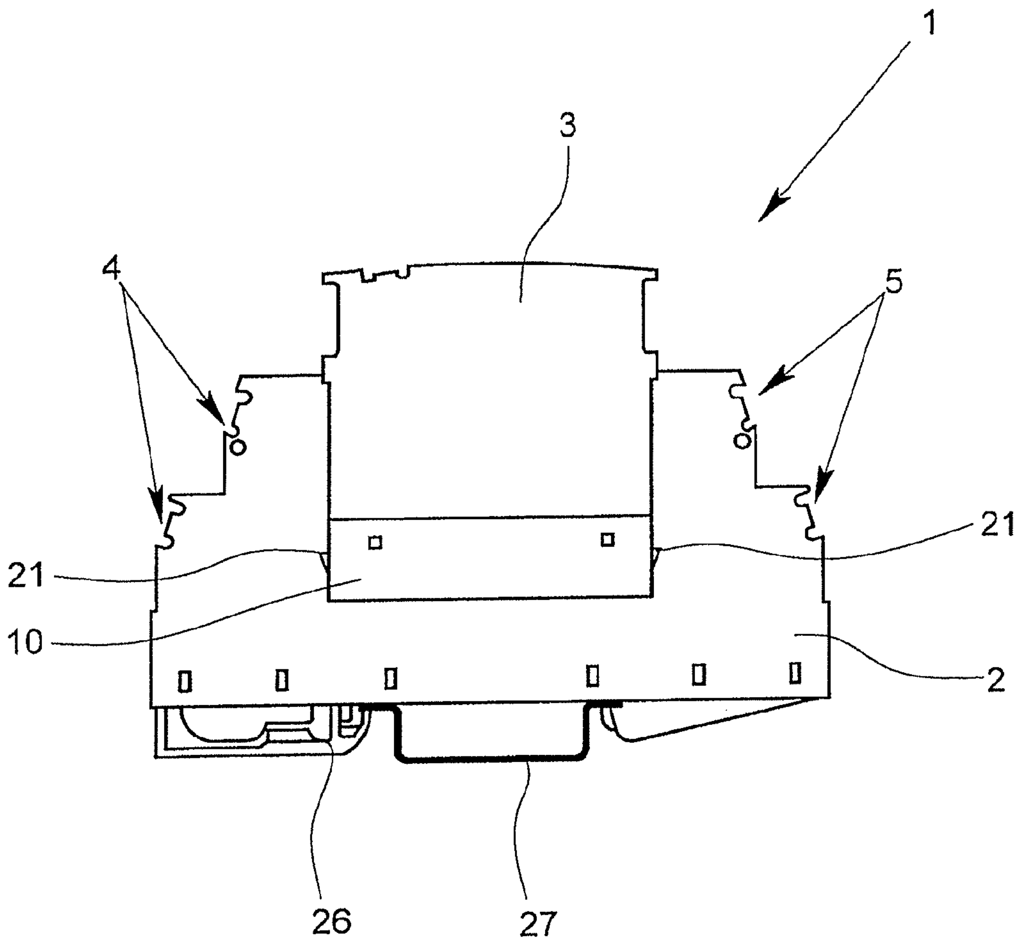
FIG. 1 shows one possible housing shape of an overvoltage protection device in accordance with the invention.

FIG. 1 shows a representation of an overvoltage protection device 1 which is made as a switchgear cabinet module and which has a lower device part 2 and an upper device part 3. The lower device part 3 has input terminals 4 and output terminals 5 on its two side faces which are located offset over another in two rows. The input and output terminals 4, 5 can be made especially as screw terminals or as tension spring terminals.

Figure 2:
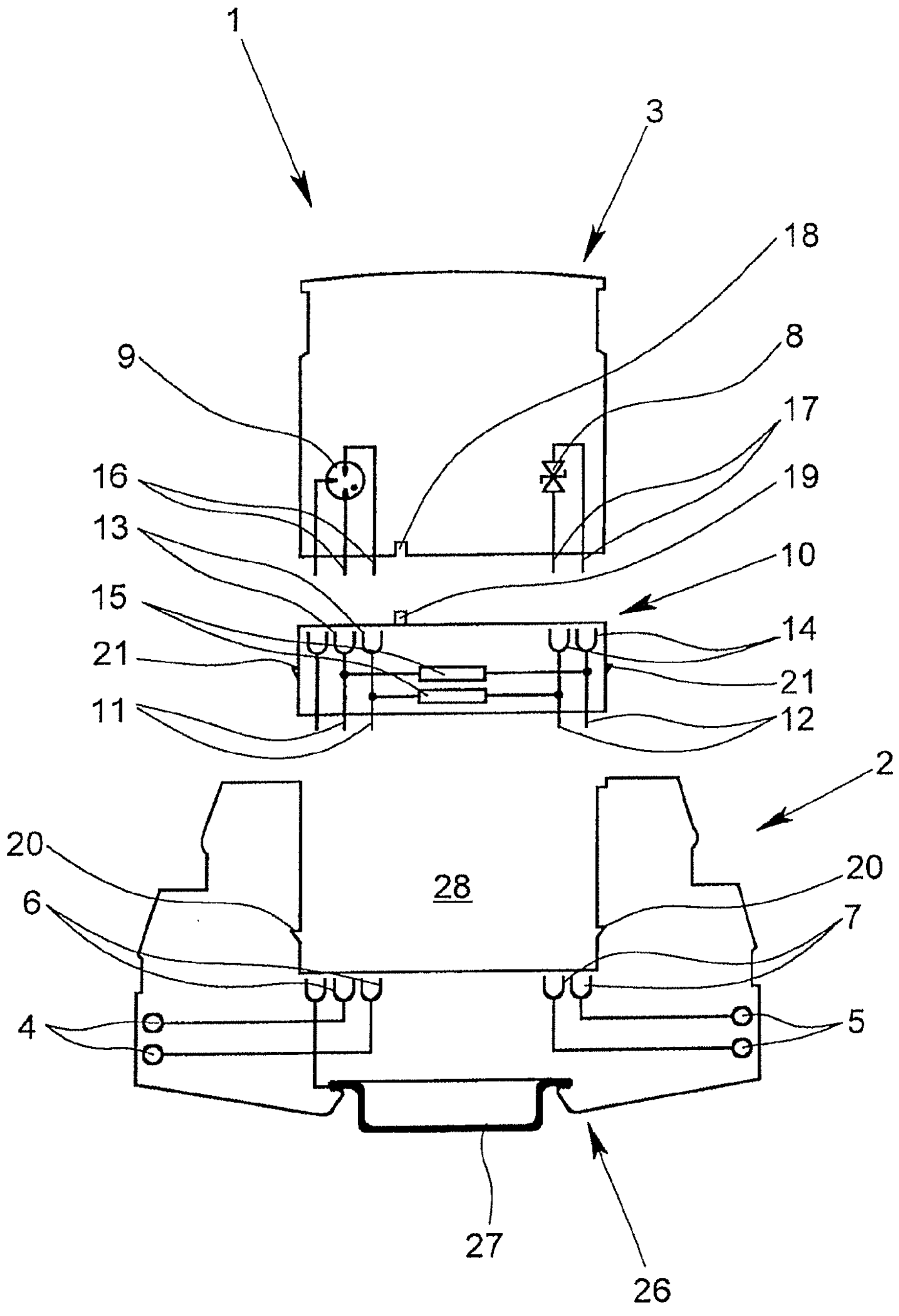
FIG. 2 shows the overvoltage protection device according to FIG. 1, in the unmated state, with a schematic representation of a circuit arrangement of the overvoltage protection elements.

As is apparent from FIG. 2, the input terminals 4 are connected to contact elements 6 and the output terminals 5 are connected to contact elements 7, contact elements 6, 7 being made as plug sockets in the illustrated exemplary embodiment. In the overvoltage protection device 1 in accordance with the invention, the upper device part 3 which has the overvoltage protection elements 8, 9, is not plugged directly onto the lower device part 3, but instead the upper device part 3 is directly plugged onto an intermediate device part 10 which is connected to the lower device part 3. For this purpose, the intermediate device part 10 has mating contact elements 11, 12 on its bottom which correspond to the contact elements 6, 7 of the lower device part 2 and contact elements 13, 14 which are connected to the mating contact elements 11, 12 for plugging-on of the upper device part 3. The mating contact elements 11, 12 are made here as plug pins and the contact elements 13, 14 on the top of the intermediate device part 10 are made as plug sockets.

In the intermediate device part 10 in the illustrated exemplary embodiments, there are two longitudinal elements 15 which can be, for example, decoupling resistors. The longitudinal elements 15 are located between two mating contact elements 11, 12 so that, when the intermediate device part 10 is plugged onto the lower device part 2, the input terminals 4 are connected via s respective longitudinal element 15 to the output terminals 5. In order to be able to plug the upper device part 3 onto the intermediate device part 10, the upper device part 3 has mating contact elements 16, 17 on its bottom which correspond to the contact elements 13, 14, and which, in this case, are made in turn as plug pins. If the upper device part 3 is plugged onto the intermediate device part 10, decoupling of the two overvoltage protection elements 8, 9, which are located in the upper device part 3, takes place via longitudinal elements 15 which are connected between them.

Figure 3:
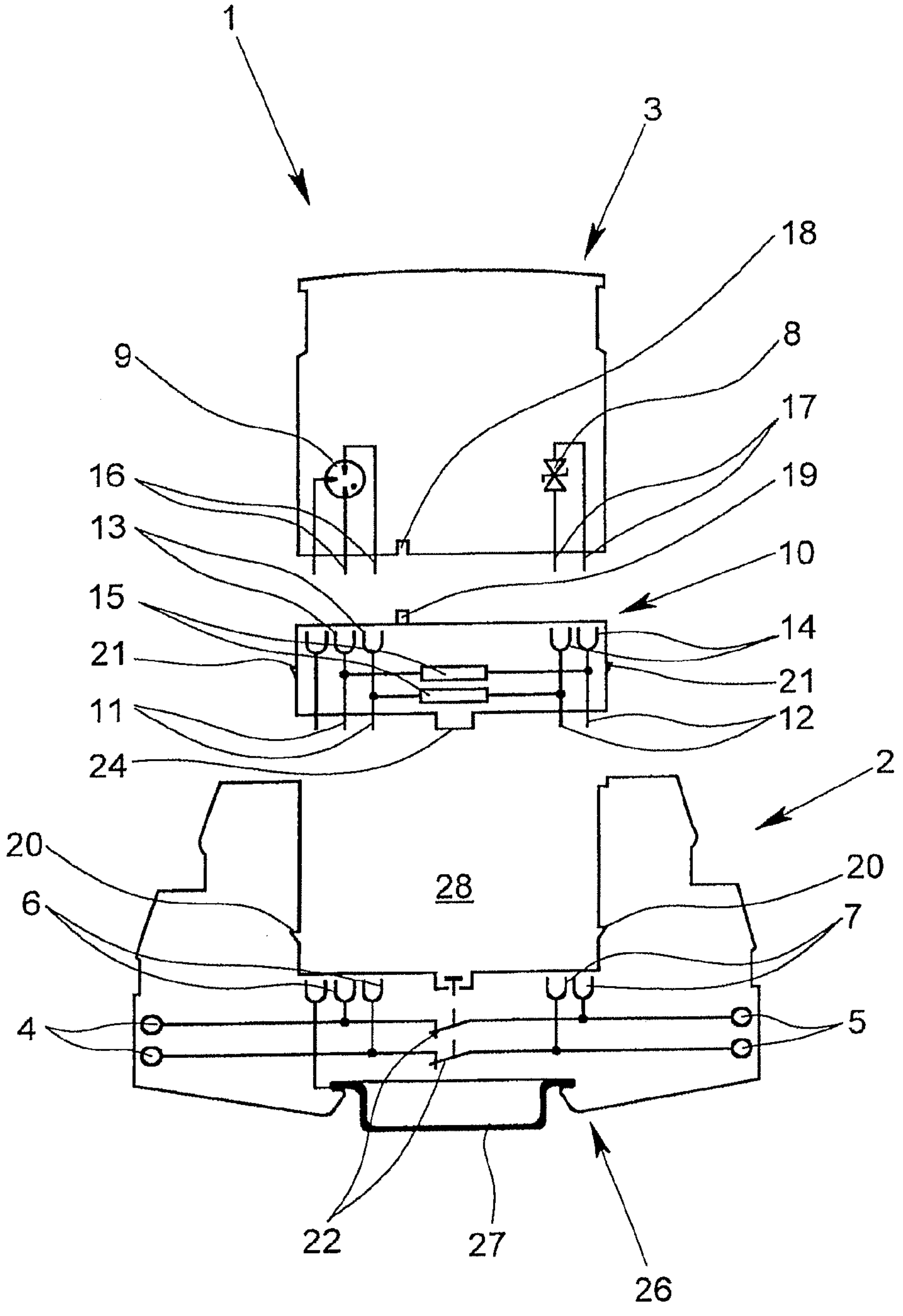
FIG. 3 shows another version of the overvoltage protection device, in the unmated state, with a schematic representation of a circuit arrangement of the overvoltage protection elements.
Figure 4:
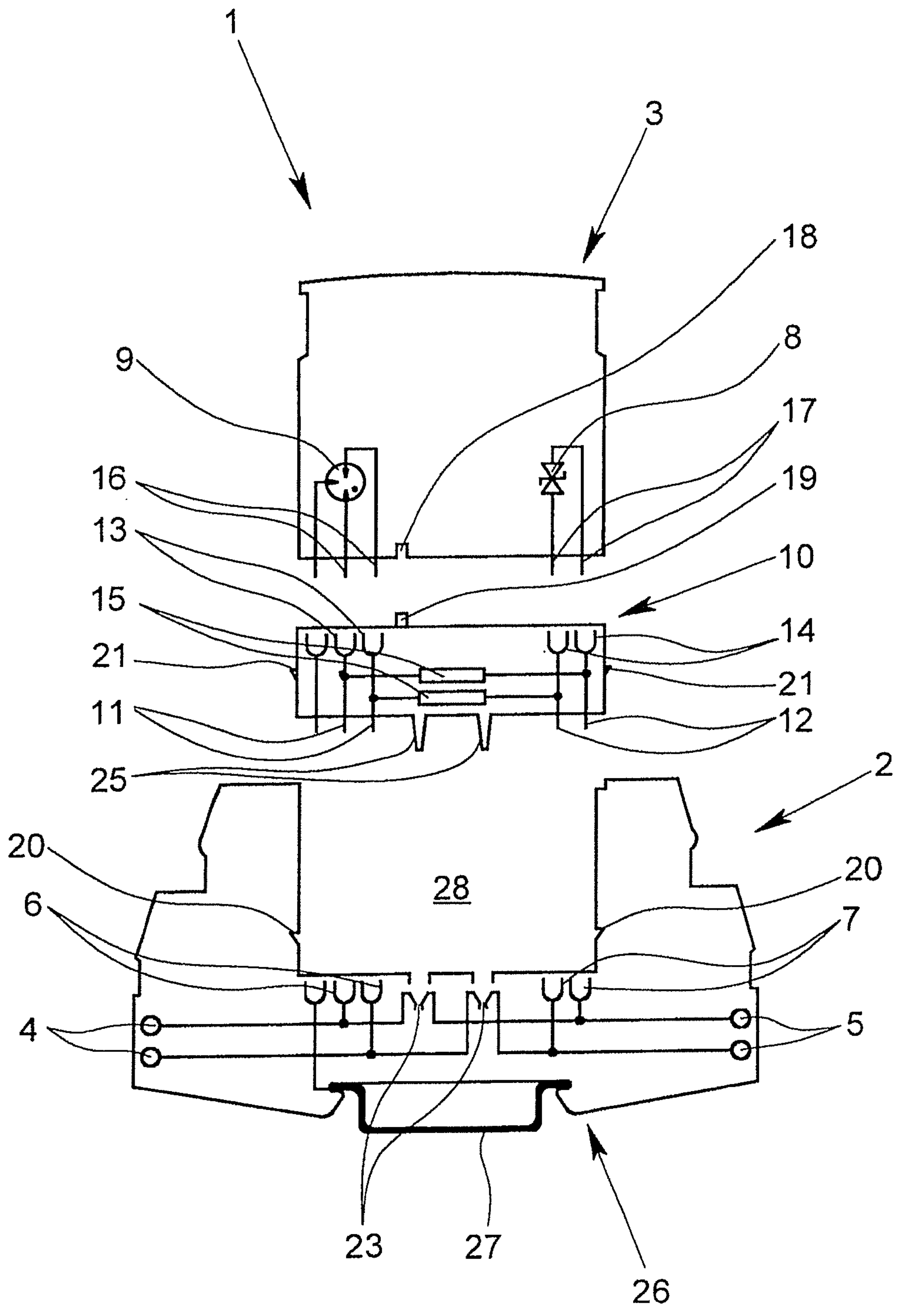
FIG. 4 shows a further version of the overvoltage protection device, in the unmated state, with a schematic representation of a circuit arrangement of the overvoltage protection elements.

In the exemplary embodiments which are shown in FIGS. 2 to 4, in the upper device part 3 there are a suppressor diode (as a fine protection element 8) and a gas-filled surge arrester (as a coarse protection element 9). In order to ensure that the upper device part 3 can be plugged only onto a particular intermediate device part 10 which has longitudinal elements 15 which are matched to the overvoltage protection elements 8, 9, a recess 18 is formed on the bottom of the upper device part 3 and on the top of the part 3, and there is a corresponding coding pin 19 on the top of the intermediate device part 10.

In order to ensure that, when the upper device part 5 is withdrawn from the intermediate device part 10, the intermediate device part 10 is not unintentionally withdrawn from the lower device part 2 at the same time, a latching is formed between the lower device part 2 and the intermediate device part 10, for which in the lower device part 2 is formed with two recesses 20 and a latch projection 21 is provided on the side faces of the intermediate device part 10 corresponding thereto. The latch bevel of the latch projection 21 is made such that the intermediate device part 10 can be plugged relatively easily, especially without a tool, onto the lower device part 2, however withdrawal of the intermediate device part 10 from the lower device part 2 is not easily possible in any case.

In the exemplary embodiment according to FIG. 2, the input terminals 4 are not connected to the corresponding output terminals 5 when the intermediate device part 10 is not plugged on. In contrast thereto, in the exemplary embodiments according to FIGS. 3 & 4, the input terminals 4 are connected in an electrically conductive manner to the corresponding output terminals 5 via a respective break contact 22 (FIG. 3) and isolating contact 23 (FIG. 4). In the ideal case, the lower device part 2 then has a longitudinal impedance whose resistance is roughly 0 ohm.

At this point, in the exemplary embodiment according to FIG. 3, if the intermediate device part 10 is plugged onto the lower device part 2, this leads to the two break contacts 22 in the lower device part 2 being opened by the projection 24 which is made on the bottom of the intermediate device part 10 as an actuating section. In the exemplary embodiment according to FIG. 4, in which a respective isolating contact 23 is located between an input terminal 4 and the corresponding output terminal 5, the isolating contacts 23 are separated from one another by the isolating pins 25 which are made on the bottom of the intermediate device part 10 when the intermediate device part 10 is plugged on.

In the two exemplary embodiments, after plugging the intermediate device part 10 onto the lower device part 2, the input terminals 4 are each connected to the output terminals 5 via a longitudinal element 15 in the intermediate device part 10. The "0 ohm" longitudinal impedance which is implemented first in the lower device part 2 is thus changed to the longitudinal impedance of the intermediate device part 10 which is matched to the protection circuit in the upper device part 3.

Moreover, it is apparent from the figures that the lower device part 2 has a mounting foot 26 for fastening the overvoltage protection device 1 on a mounting rail 27. Via the mounting foot 26, one of the contact elements 6 of the lower device part 2 is connected in an electrically conductive manner to the mounting rail 27 when the lower device part 2 is latched on the mounting rail 27.

Also, it can be seen from the figures that the lower device part 2 is roughly U-shaped, as a result of which a receiving space 28 is formed for the intermediate device part 10 and the upper device part 3 which is plugged on the latter and which has the same base area. When the overvoltage protection device 1 is mounted, in general, first the lower device part 2 is latched on the mounting rail 27. Afterwards, either first the intermediate device part 10 can be latched onto the lower device part 2 and then the upper device part 3 can be plugged onto the intermediate device part 10 or the upper device part 3 is first plugged onto the intermediate device part 10 and then the two components are jointly plugged into the receiver 28 in the lower device part 2 and latched to the lower device part 2.

What is claimed is:

1. An overvoltage protection device for protecting electrical low voltage installations, comprising:

a lower device part, having input and output terminals for electrical conductors to be connected and contact elements which are connected to the input and output terminals, at least one upper device part, having at least one overvoltage protection element, and an intermediate device part which has mating contact elements which correspond to the contact elements of the lower device part enabling it to be plugged onto the lower device part and contact elements onto which mating contact elements of the upper device part can be plugged, wherein the intermediate device part has at least one longitudinal electrical element which is connected between the two mating contact elements thereof, and wherein the mating contact elements of the intermediate device part are one of plug pins and plug sockets and wherein the contact elements which are connected to the mating contact elements of the intermediate device part are the other of plug sockets and pins.

2. An overvoltage protection device for protecting electrical low voltage installations, comprising:

a lower device part, having input and output terminals for electrical conductors to be connected and contact elements which are connected to the input and output terminals, at least one upper device part, having at least one overvoltage protection element, and an intermediate device part which has mating contact elements which correspond to the contact elements of the lower device part enabling it to be plugged onto the lower device part and contact elements onto which mating contact elements of the upper device part can be plugged, wherein the intermediate device part has at least one longitudinal electrical element which is connected between the two mating contact elements thereof, and wherein the at least one longitudinal electrical element is one of a resistor and an inductance.

3. An overvoltage protection device for protecting electrical low voltage installations, comprising:

a lower device part, having input and output terminals for electrical conductors to be connected and contact elements which are connected to the input and output terminals, at least one upper device part, having at least one overvoltage protection element, and an intermediate device part which has mating contact elements which correspond to the contact elements of the lower device part enabling it to be plugged onto the lower device part and contact elements onto which mating contact elements of the upper device part can be plugged, wherein the intermediate device part has at least one longitudinal electrical element which is connected between the two mating contact elements thereof, and wherein the mating contact elements of the upper device part are one of plug sockets and plug pins and the contact elements of the intermediate device part are the other of plug sockets and pins.

4. The overvoltage protection device as claimed in claim 1, wherein said at least one overvoltage protection element comprises at least two overvoltage protection elements, wherein the upper device part has at least one fine protection element and at least one coarse protection element.

5. The overvoltage protection device as claimed in claim 4, wherein said at least one fine protection element comprises at least one of a suppressor diode and a varistor, and wherein said at least one coarse protection element comprises at least one of a spark gap and a gas-filled surge arrester.

6. The overvoltage protection device as claimed in claim 1, wherein coding is formed between the upper device part and the intermediate device part.

7. The overvoltage protection device as claimed in claim 6, wherein said coding comprises a recess on a bottom side of the upper device part and a corresponding coding pin on a top side of the intermediate device part.

8. The overvoltage protection device as claimed in claim 1, wherein a latching is provided for securing the lower device part and the intermediate device part together.

9. The overvoltage protection device as claimed in claim 8, wherein said latching is adapted to captively latch the intermediate device part in the lower device part when the intermediate device part is plugged onto the lower device part.

10. The overvoltage protection device as claimed in claim 1, wherein the input and output terminals in the lower device part are connected to one another in an electrically conductive manner via a separable element which is adapted to separate when the intermediate device part is plugged onto the lower device part so that the input and output terminals are connected to one another via the longitudinal electrical elements in the intermediate device part.

11. The overvoltage protection device as claimed in claim 10, wherein the separable elements are one of break contacts and isolating contacts.

12. The overvoltage protection device as claimed in claim 10, wherein the lower device part has a mounting foot adapted for latching on a mounting rail.

13. The overvoltage protection device as claimed in claim 1, wherein in the lower device part at least one test tap.

14. The overvoltage protection device as claimed in claim 1, wherein the at least one test tap is a test socket.

15. The overvoltage protection device as claimed in claim 14, wherein the upper device part has a display which signals the operating state of the overvoltage protection element.

16. The overvoltage protection device as claimed in claim 1, wherein at least one of the lower device part and the upper device part has a display which signals the correct installation state of the upper device part on the intermediate device part and of the intermediate device part in the lower device part.

17. The overvoltage protection device as claimed in claim 1, wherein the upper device part and the intermediate device part have the same base area.

18. The overvoltage protection device as claimed in claim 2, wherein the input and output terminals in the lower device part are connected to one another in an electrically conductive manner via a separable element which is adapted to separate when the intermediate device part is plugged onto the lower device part so that the input and output terminals are connected to one another via the longitudinal electrical elements in the intermediate device part.

19. The overvoltage protection device as claimed in claim 18, wherein the separable elements are one of break contacts and isolating contacts.

20. The overvoltage protection device as claimed in claim 11, wherein the lower device part has a mounting foot adapted for latching on a mounting rail.

* * * * *